Patented Nov. 2, 1948

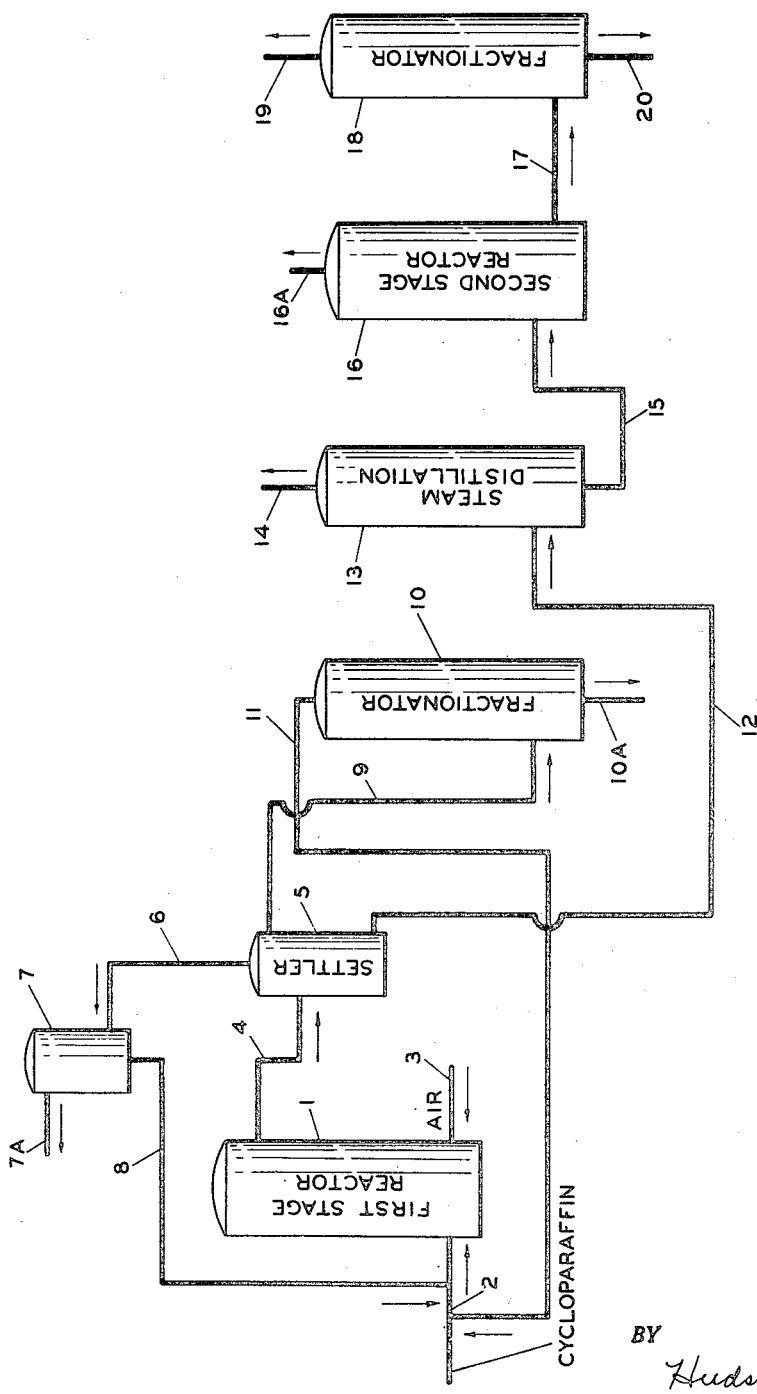

2,452,741

UNITED STATES PATENT OFFICE 2,452,741

PRODUCTION OF DIBASIC ACIDS

Harold W. Fleming, Bartlesville, Okla., assignor to Phillips Petroleum Company, a corporation of Delaware Application March 28, 1947, Serial No. 737,973

10 Claims. (Cl. 260—533)

The present invention relates to the production of dibasic acids and particularly to the manufacture of dibasic aliphatic acids by the oxidation of cycloparaffins. In a more particular aspect the present invention relates to the manufacture of cyclic ketones and dibasic acids from cycloparaffins by oxidation.

Oxidation of cycloparaffins with air, to produce cyclic ketones and alcohols, is known to the art. Specifically, it is known that satisfactory yields of cyclopentanone and cyclopentanol can be obtained by oxidation of cyclopentane with air. Such an oxidation process may be conducted by bubbling air through liquid cyclopentane at a suitable temperature such as 120 to 170° C. and superatmospheric pressure. When the total liquid oxidation product is removed from the oxidation zone and allowed to stand at room temperature, it separates into two liquid phases. The lighter or organic phase comprises most of the cyclic ketone and cyclic alcohol produced and substantially all the unreacted cycloparaffin. The heavier or aqueous phase comprises water, small amounts of ketones, alcohols, fatty acids, esters, and appreciable amounts of hydroxy acids and lactones. The formation of such an aqueous phase has been observed in connection with air oxidation of such cycloparaffins as cyclopentane, methylcyclopentane, cyclohexane, and methylcyclohexane. For example, the aqueous layer produced in the oxidation of cyclopentane with air at 140° C. has approximately the following composition:

| | |
|---|---|
| Water | wt. per cent 20 |
| Fatty acids<br>Cyclopentanone<br>Cyclopentanol<br>Esters | wt. per cent 5 |
| $\Delta$-hydroxyvaleric acid<br>$\gamma$-hydroxybutyric acid<br>$\Delta$-valerolactone<br>$\gamma$-butyrolactone<br>Polymer | wt. per cent 75 |

It is an object of the present invention, therefore, to provide a process for the oxidation of cycloparaffins to form cyclic ketones and aliphatic dibasic acids. It is a further object of the present invention to provide a process for the two stage oxidation of cycloparaffins in order to produce cyclic ketones and by-products in the first stage, and dibasic acids from said by-products in a second stage. It is an additional object of the present invention to produce aliphatic dibasic acids by the oxidation of aqueous solutions containing mixtures of hydroxy acids and lactones.

In accordance with this invention, the aqueous phase, produced as a by-product of the oxidation of a cycloparaffin, is oxidized with nitric acid to obtain dibasic aliphatic acids. When the cycloparaffin oxidized is cyclopentane, succinic and glutaric acids are produced in satisfactory yields. Catalysts, such as vanadium pentoxide, may be used if desired. The concentration of the nitric acid used may vary within rather wide limits, but is preferably 20 to 60 weight per cent. The weight ratio of nitric acid (based on 100 per cent $HNO_3$) to aqueous phase treated is preferably about 3:2, although lower or higher ratios may be used if desired. Reaction time may range from 30 to 120 minutes, but is preferably 1 hour. The preferred temperature range is 50 to 90° C. Although separately heating the reactants to reaction temperature is desirable, further heating, after mixing is, in many cases, unnecessary, since the oxidation reaction is exothermic. In certain embodiments of the invention, however, heating during the final stages of reaction is desirable for obtaining maximum yields.

The present invention, therefore, provides a two-stage process for the oxidation of cycloparaffins, in which said cycloparaffins, for example, cyclopentane or cyclohexane, are oxidized in a first stage to form cyclic ketones along with water soluble hydroxy acids and lactones as primary by-products. The aqueous by-product solution is then oxidized further in a second stage to form aliphatic dibasic acids as the primary product. Preferably, the first stage oxidation is carried out with air; while the second stage oxidation may be carried out with nitric acid as the oxidizing agent or with air or other oxygen-containing gas. In the latter case, the air or other oxygen-containing gas is preferably utilized in acid media, for example, with acetic acid, at moderately elevated temperature.

The manner of carrying out the present invention may be illustrated by reference to the drawing which describes a flow diagram of a typical procedure. In the drawing, a cycloparaffin is introduced into reactor 1 via line 2. Air is introduced through line 3. The oxidation may be carried out continuously at a suitable temperature, usually in the range of about 100–250° C., and in the presence of an oxidation catalyst of the type known to the prior art, such as a metal naphthenate. The reaction is preferably carried out in the absence of a catalyst but a longer induction period may be required at the same temperature. The reaction may be carried out in liquid, mixed, or gaseous phase at normal, or superatmospheric pressures as high as 1000 atmospheres or more. Preferably pressures in the range of 2-100 atmospheres are used. After a suitable residence time, say for ⅓-5 hours, depending upon the conversion desired, where the reaction is carried out in liquid phase, the effluent is passed via line 4 to a settler 5 to permit settling and separation of an organic phase from a water phase. Gaseous components of the effluent pass overhead via line 6 to cooler 7 where liquid material, which includes unreacted feed, is separated and returned to the reactor by means of line 8 and uncondensed gas is removed from the system through outlet 7A.

The lighter, organic phase is removed from the settler through line 9, and fractionated in 10 for the separation of cyclic ketones and alcohols, such as cyclopentanone and cyclopentanol, which are removed through outlet 10A. Unreacted cycloparaffin such as cyclopentane is separated overhead and recycled through line 11. Heavier, aqueous phase containing hydroxy acids and lactones as principal components of the by-products of oxidation are removed from the separator through line 12 and separated, preferably by steam distillation in 13 to remove overhead, through outlet 14, any dissolved cyclic alcohol and ketone which are recovered and combined with the product from 10. The residue from steam distillation is introduced via line 15 into second stage reactor 16 where it is contacted with nitric acid.

The oxidation may be carried out at a suitable temperature, preferably between 50 and 100° C., while the nitric acid concentration is preferably between 25 and 35%. In general, with 30% nitric acid, the preferred temperature range is 60-80° C. with a reaction time of 60-100 minutes. The time of reaction will vary but will ordinarily be from one to two hours. Nitrogen oxides evolved during the reaction may be recovered through outlet 16A, and reconverted to nitric acid in the manner known to the art. The mixture of oxidation products and nitric acid is then introduced into vacuum still 18 via line 17, where it is vacuum distilled to remove excess water and nitric acid through 19, the nitric acid being recovered for re-use. The residue is removed via line 20 and is extracted with benzene to dissolve the glutaric acid (where the feed has comprised cyclopentane); the acid is then recovered from solution by evaporation of the benzene. The benzene-insoluble residue is dissolved in water and succinic acid recovered by crystallization.

The following examples describe specific modes of carrying out the invention:

I

Cyclopentane was oxidized with air in a continuous reactor at 140° C. and 400 p. s. i. After a contact time of one hour, the liquid effluent was passed to a settler, in which an organic phase and an aqueous phase separated. The organic phase was fractionated, after peroxide removal, and cyclopentanone and cyclopentanol were obtained as the principal products.

To 150 grams of the aqueous phase was added 100 ml. of water, and the mixture was distilled to obtain 115 ml. of distillate, which separated into two phases; the lighter phase had a volume of 15 ml. and comprised cyclopentanone and cyclopentanol.

In a three-neck flask, provided with a motor-driven stirrer and a vapor exhaust tube, were mixed 60 ml. of 73 per cent nitric acid and 140 ml. of distilled water. Two dropping funnels were connected to the flask; one contained 73 per cent nitric acid; the other contained the residue from the steam distillation described above. The contents of the flask were heated to 75 to 85° C., and 10 ml. of the aqueous residue was added from the dropping funnel. After a short induction period, oxidation began, as indicated by the formation of bubbles in the acid solution. Ten-ml. portions of the aqueous residue and of the 73 per cent nitric acid were then alternately added, from the dropping funnels, at such a rate that the temperature in the flask was maintained at 65 to 70° C. by the heat of the reaction. After all of the aqueous residue had been added, the contents of the flask were maintained at 65 to 70° C., by external heating, for 1 hour. The excess nitric acid was then removed by vacuum distillation. The residue was extracted with benzene, and 57 grams of glutaric acid was recovered from the benzene solution. By recrystallization of the benzene-insoluble residue from water, 23 grams of succinic acid was obtained.

II

Cyclopentane was oxidized with air to produce cyclopentanone and cyclopentanol in an apparatus and under conditions similar to those described in Example I. Liquid effluent from the oxidation reactor was passed to a settler and allowed to separate into an aqueous phase and an organic phase. By steam distillation of 108 grams of the aqueous phase, 10 ml. of organic material comprising cyclopentanone and cyclopentanol was recovered. The residue from the steam distillation was oxidized with nitric acid at 75 to 80° C. by substantially the same procedure as was employed in Example I. The total weight of nitric acid used was 177 grams, based on 100 per cent $HNO_3$; the actual concentration of acid was approximately equal to that employed in Example I. The mixture of excess nitric acid and oxidation products was treated as described in Example I. Eighty grams of nitric acid, based on 100 per cent $HNO_3$, was recovered by vacuum distillation. The yields of succinic acid and glutaric acid were 23 and 31 grams, respectively.

III

Data obtained from the experiments described in Examples I and II are presented in the following table for comparison:

| Example | I | II |
| --- | --- | --- |
| Temp., °C | 65-70 | 75-80 |
| Yields, weight percent of aqueous phase treated: | | |
| $(CH_2)_2(COOH)_2$ | 15 | 21 |
| $(CH_2)_3(COOH)_2$ | 38 | 29 |
| Total | 53 | 50 |
| $HNO_3$ Consumption, weight percent of aqueous phase treated | 80 | 90 |

From the data above, it is evident that higher temperatures in the preferred range favor higher yields of succinic acid, whereas lower temperatures favor higher yields of glutaric acid. This trend is corroborated by the higher nitric acid consumption at 75 to 80° C.

I claim:

1. A process for the production of dibasic aliphatic acids which comprises oxidizing a cycloparaffin in liquid phase with gaseous oxygen to form a mixture containing a non-aqueous phase comprising cyclic ketones and cyclic alcohols and an aqueous phase comprising aliphatic hydroxy acids and lactones, separating said aqueous phase from the non-aqueous phase and further oxidizing said aqueous phase at a temperature of 50 to 90° C. with nitric acid to form the corresponding dibasic acids.

2. A process according to claim 1 wherein the first oxidation step is effected at a temperature of from 100 to 250° C. and at a superatmospheric pressure.

3. A process according to claim 1 wherein the cyclo-paraffin is cyclopentane.

4. A process according to claim 1 wherein the second oxidation step is effected with nitric acid having a concentration of 20 to 60 weight per cent.

5. A process according to claim 3 wherein the second oxidation step is effected at a temperature between 50 and 70° C. and the dibasic acid produced comprises glutaric acid.

6. A process according to claim 3 wherein the second oxidation step is effected at a temperature between 70 and 90° C. and the dibasic acid produced comprises succinic acid.

7. A process according to claim 1 wherein the cycloparaffin is cyclohexane.

8. A process for the production of dibasic aliphatic acids which comprises oxidizing a cycloparaffin in liquid phase with gaseous oxygen to form a mixture containing a non-aqueous phase comprising cyclic ketones and cyclic alcohols and an aqueous phase comprising aliphatic hydroxy acids and lactones, separating said aqueous phase from the non-aqueous phase and further oxidizing said aqueous phase at a temperature of 50 to 90° C. with gaseous oxygen to form the corresponding dibasic acids.

9. A process for the production of dibasic aliphatic acids which comprises oxidizing a cycloparaffin with gaseous oxygen to form a mixture containing a non-aqueous phase comprising cyclic ketones and cyclic alcohols and an aqueous phase comprising aliphatic hydroxy acids and lactones, separating said aqueous phase from the non-aqueous phase and further oxidizing said aqueous phase at a temperature of 50 to 90° C. with nitric acid to form the corresponding dibasic acids.

10. A process for the production of dibasic aliphatic acids which comprises oxidizing a cycloparaffin with gaseous oxygen to form a mixture containing a non-aqueous phase comprising cyclic ketones and cyclic alcohols and an aqueous phase comprising aliphatic hydroxy acids and lactones, separating said aqueous phase from the non-aqueous phase and further oxidizing said aqueous phase at a temperature of 50 to 90° C. to form the corresponding dibasic acids.

HAROLD W. FLEMING.

REFERENCES CITED

The following references are of record in the file of this patent:

UNITED STATES PATENTS

| Number | Name | Date |
| --- | --- | --- |
| 1,895,799 | James | Jan. 31, 1933 |
| 1,921,101 | Shrouth | Aug. 8, 1933 |
| 2,085,499 | James | June 29, 1937 |
| 2,109,700 | James | Mar. 1, 1938 |
| 2,228,769 | Alleman et al. | July 7, 1942 |
| 2,369,181 | Rust et al. | Feb. 13, 1945 |
| 2,385,518 | Isham | Sept. 25, 1945 |
| 2,389,950 | Mackay et al. | Nov. 27, 1945 |